United States Patent [19]
Chau et al.

[11] Patent Number: 5,838,936
[45] Date of Patent: Nov. 17, 1998

[54] ELASTIC BUS INTERFACE DATA BUFFER

[75] Inventors: Vi Chau, Laguna Niguel; Sam Su, Rowland Hts.; Dan Tarr, Irvine, all of Calif.

[73] Assignee: Emulex Corporation, Costa Mesa, Calif.

[21] Appl. No.: 813,271

[22] Filed: Mar. 10, 1997

[51] Int. Cl.$^6$ ........................................................ G06F 9/38
[52] U.S. Cl. ........................ 395/309; 395/310; 395/840; 395/878; 395/559
[58] Field of Search .................................... 395/309, 310, 395/306, 840, 841, 878, 559

[56] References Cited

U.S. PATENT DOCUMENTS

5,157,772  10/1992  Watanabe ................................ 395/306
5,619,668   4/1997  Zaidi ...................................... 395/376

*Primary Examiner*—Meng-Ai T. An
*Assistant Examiner*—Rupal D. Dharia
*Attorney, Agent, or Firm*—Fish & Richardson P.C.

[57] ABSTRACT

An elastic bus interface receives and registers an external data transfer signal and generates an internal data transfer signal that always begins at the beginning of the subsequent clock cycle regardless of the time of arrival of the external data transfer signal. By employing a plurality of data output registers in a pipeline and using only the internal data transfer signal, data is fed to a bus so as to ensure that almost a complete clock cycle is available for setup time to accomplish data transfer. The invention can operate with high speed buses using only simple conventional circuitry and modest process geometries requiring only minimal chip area and power.

16 Claims, 7 Drawing Sheets

FIG. 7

ELASTIC BUS INTERFACE DATA BUFFER

BACKGROUND OF THE INVENTION

1. Field of the Invention

This invention relates to data management, and more particularly, to transferring of data between devices on a bus.

2. Description of Related Art

Computer systems frequently transfer data between devices along a communication channel, such as a bus. In bus transactions, a device typically uses one or more bus signals as an "enable" signal to latch valid data going into, or out of, the device. These bus signals are also used to indicate the state of the bus.

Bus speeds having been increasing in many types of bus designs, including, for example, synchronous buses. Faster speeds can create problems in transferring data out of a device onto a bus. Once an enable signal is received, the device needs a finite amount of time to move the data from the device to a data output register that is connected to the bus. During this time, referred to as "setup time", the device must also make decisions regarding bus states. For example, these decisions may involve the selection of one of a plurality of data sources and data registers.

The required setup time is even greater for wide data buses. In such buses, extensive fan-out of the enable signal is required as the signal flows through a logical path reach the desired data source. This fan-out slows down the enable signal, thereby increasing the required setup time. This exacerbates the problem created by the reduced setup time in high-speed buses. The issue of shrinking setup time in high-speed buses has been addressed by using very fast logic circuits for control and data paths. However, this logic generally requires fine process geometry, which takes up considerable chip area and consumes excess power. The fan-out problem has been addressed by using multiple copies of the enable signal to drive this logic. The fan-out of each copy of the signal is lowered, reducing the signal delay during the loading process. However, the use of multiple copies of the enable signal also requires additional chip area and consumes excess power.

Figure 1:
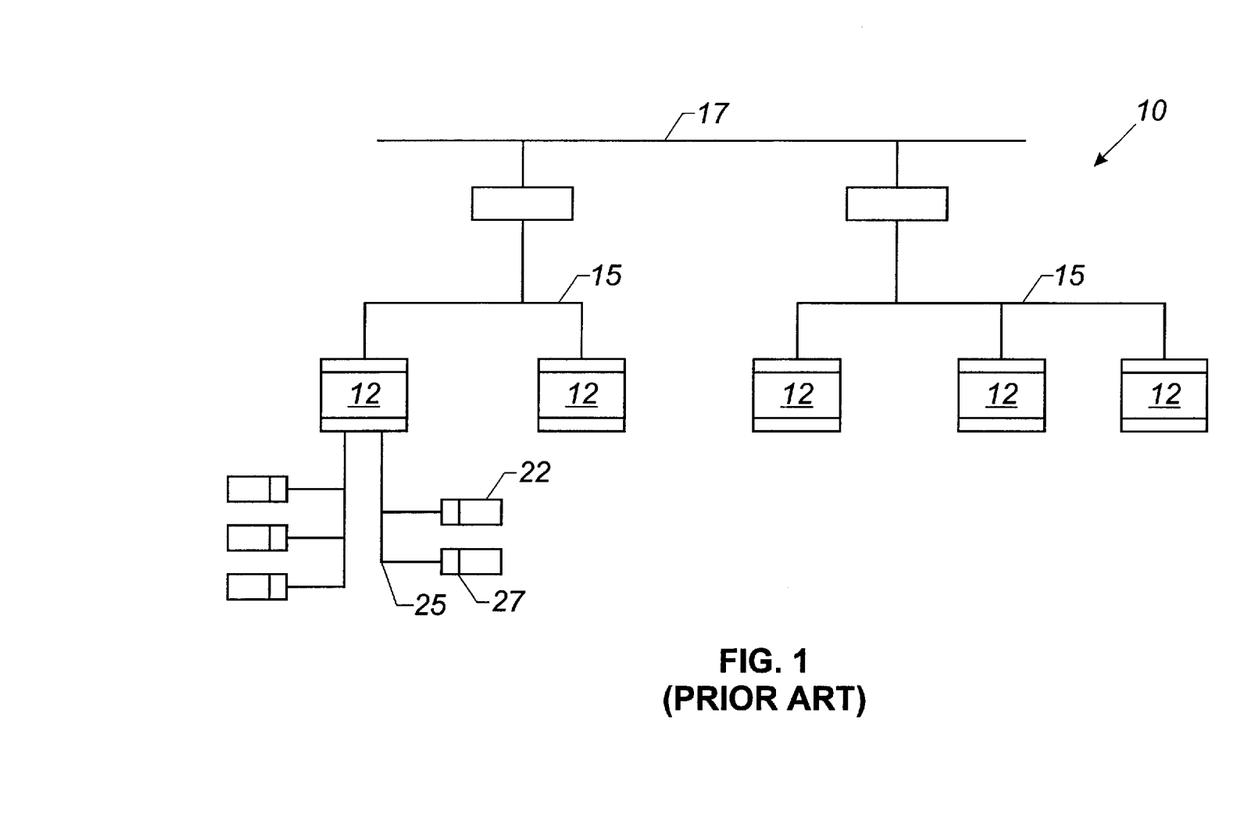
FIG. 1 is a block diagram of a typical prior art computer system.

In a typical bus transaction involving two devices, one device is the data source and the other device receives data items provided to the bus by the first device. FIG. 1 shows such a transaction in a typical system which transfers data between components of a computer system 10. The computer system 10 typically includes nodes 12, such as computers, printers, and servers, linked by local area networks 15. Local-area networks (LANs) 15 may themselves be linked by a wide-area network (WAN) 17. In addition, each computer 12 may be connected to devices 22, such as disk drives or other peripheral components, through a communication link 25. The communication link 25 may be a familiar interface, such as a small computer system interface (SCSI) bus, or a peripheral component interconnect (PCI) bus. Each device 22 is connected to the communications link 25 by a bus interface unit (BIU) 27.

Figure 2:
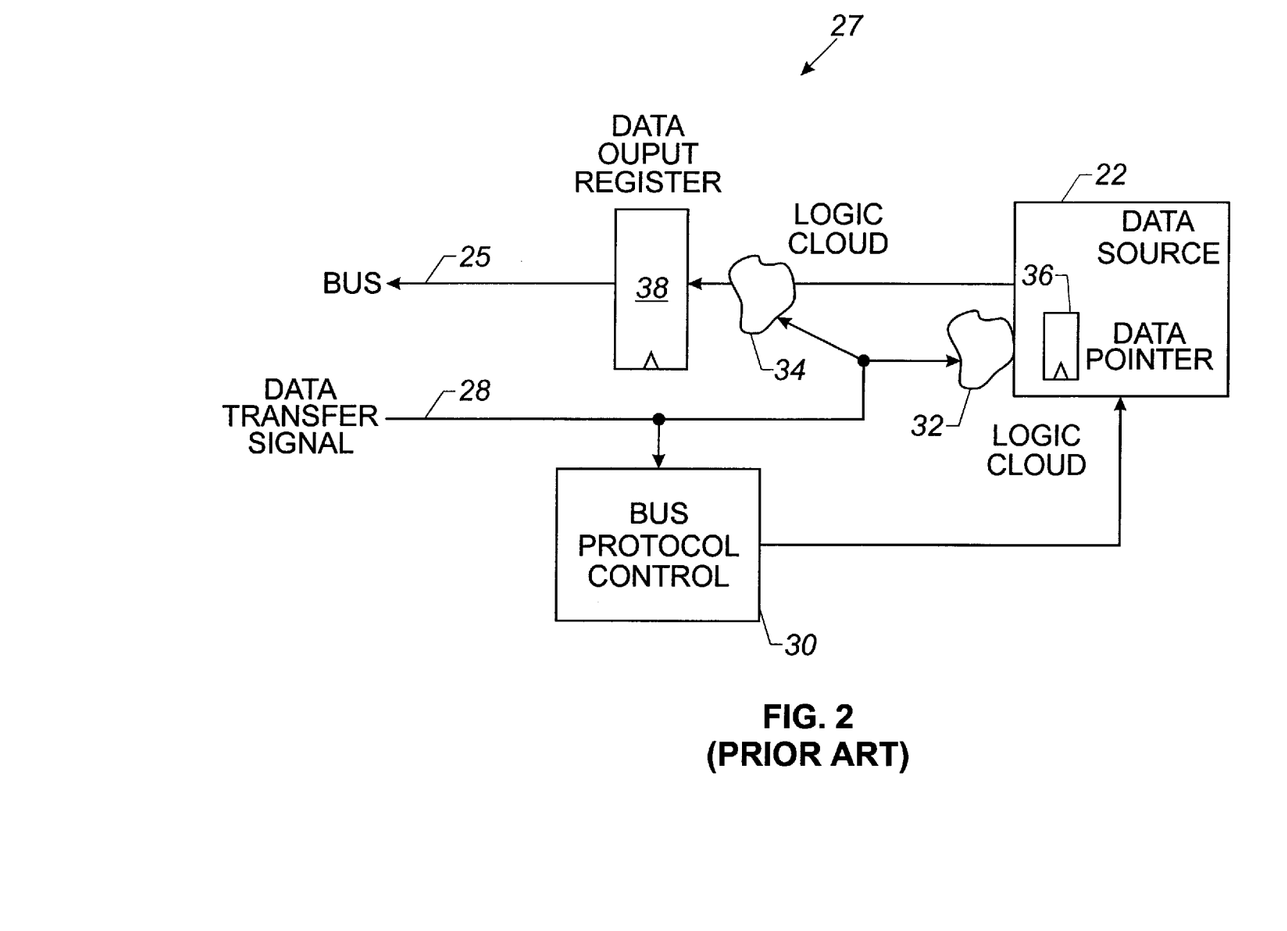
FIG. 2 is a block diagram of a portion of the computer system of FIG. 1 including details of a bus interface unit.

FIG. 2 shows one of the devices 22 in FIG. 1 connected to a bus interface unit 27 and a bus 25. A data transfer signal 28 is received from the bus and is processed by both a bus protocol control unit 30 and first and second logic circuits 32 and 34. Bus protocol control unit 30 interprets the data packet received prior to the data transfer signal 28 to determine the correct state of the bus transaction. This results in the updating of data pointers 36. For example, logic circuit 32 is used to direct the transfer signal to the correct data source among a plurality of data sources. Also, logic circuit 32 may increment the data pointer 36, select the correct data, make decisions about bus protocol, etc. Logic circuit 34 is used to select among a plurality of data output registers 38.

In an initial state, when a data transfer signal 28 is asserted, the data pointer 36 in device 22 is updated to reflect the state of the bus transaction. Also, the next data item from the device 22 is latched into the output register 38. A data item is then taken by the receiving device (such as another device 22) through bus 25 at the next clock edge. This data item will typically comprise a 16 or 32 bit word.

Figure 3:
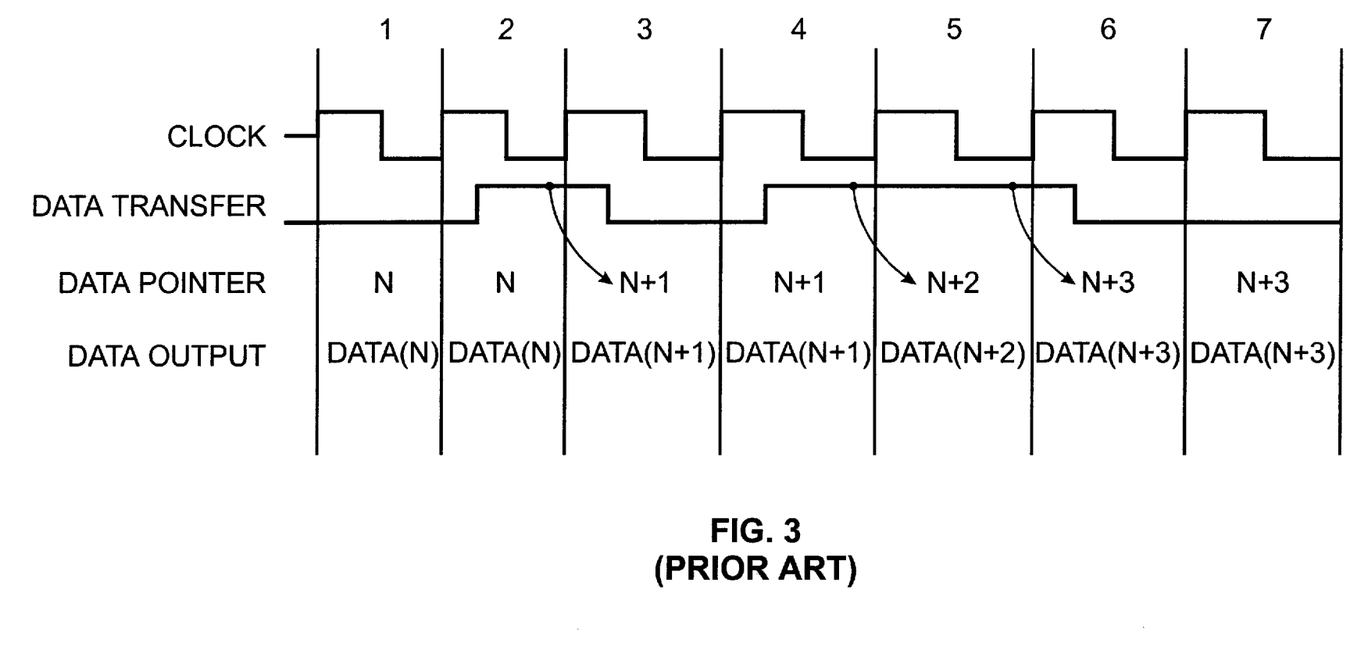
FIG. 3 is a timing diagram of the process of performing data transfer in response to a data transfer signal in the prior art computer system shown in FIG. 2.

FIG. 3 is a prior art timing diagram showing how the data transfer signal 28 is used to control the update of the data pointer 36 and the loading of a new data item into the data output register 38. In particular, FIG. 3 shows seven clock cycles. In the second clock cycle, a data transfer signal is received. This results in the update of the data pointer at the next clock edge. This is represented by the arrow pointing at N +1. At the same time, the new data item N+1 is loaded into the data register 38, where it is made available to the bus 25. A similar event occurs again in clock cycles 4 and 5.

The time available for setup is the time from when the data transfer signal is received until the next clock edge. The data is actually transferred at this next clock edge. Setup time can vary significantly. If the signal is late in the clock cycle, there may be insufficient setup time, especially where the bus 25 is fast and the logic circuits 32, 34 have a significant gate delay.

Figure 4:
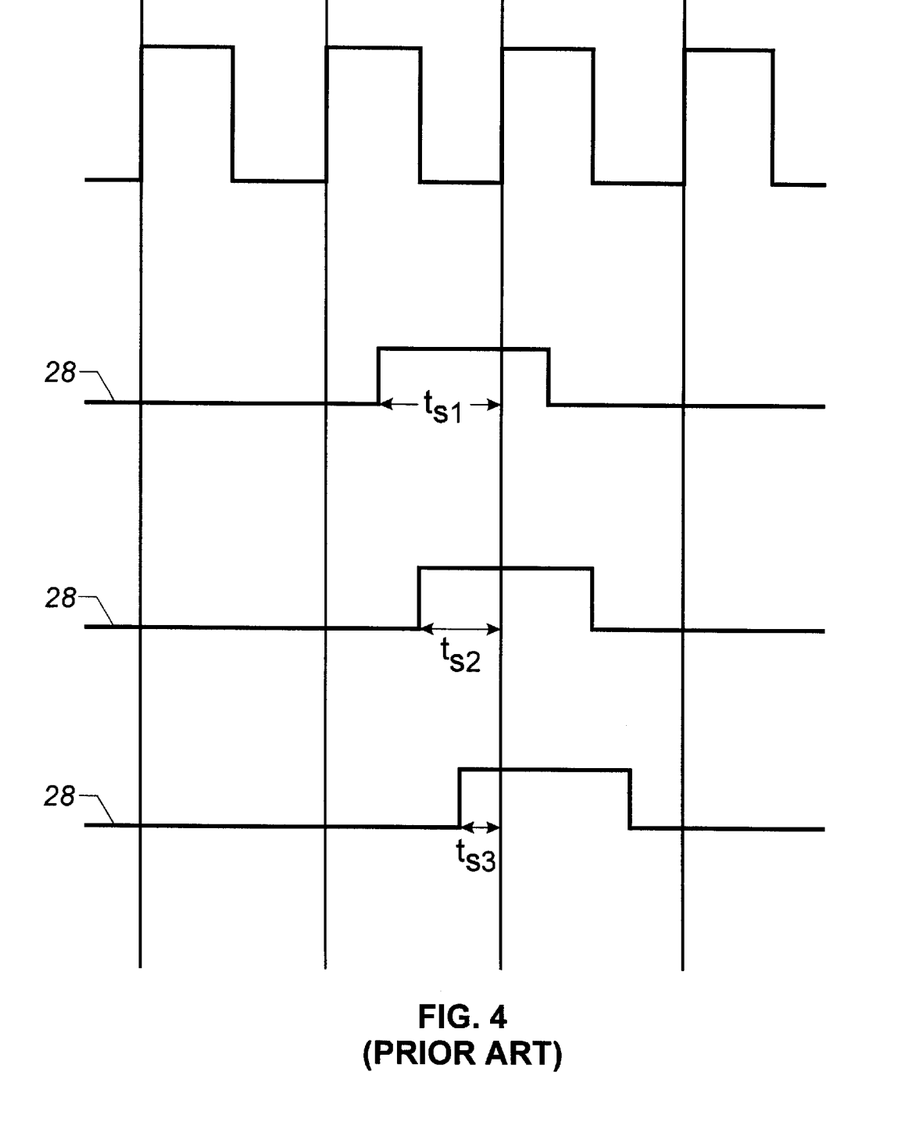
FIG. 4 shows representative timing diagrams for various arrival times of data transfer signals in accordance with the prior art computer system shown in FIG. 2.

FIG. 4 shows three situations where the data transfer signal arrives at different points within a given clock cycle. It should be noted that the illustration in FIG. 4 shows different possible situations and there will normally be only a single data transfer signal received in any given clock cycle.

It should be noted that the data transfer signal can appear at varying times within the clock cycle relative to the active clock edge. This happens because at higher bus speeds, there is less time for the device that drives the data enable signal to assert and de-assert the data enable signal within a bus-clock period.

In the first instance shown in FIG. 4, the data transfer signal 28 is received early in a clock cycle. The setup time for the system to prepare for data transfer is defined as the time from the beginning of the data transfer signal 28 until the end of the clock cycle. This time period is shown as $t_{s1}$. Data will be transferred to the data output register at the active edge of the next clock cycle. In this case, $t_{S1}$ is almost a complete clock cycle long. This will very likely afford sufficient setup time, even for a high-speed bus (e.g., operating at a clock cycle of 33 MHZ), and where the logic circuits 32 and 34 are relatively deep. For example, $t_{S1}$ may be almost 30 nanoseconds.

In the second instance shown in FIG. 4, the data transfer arrives later, in the middle of the clock cycle. Here, the available setup time, defined as $t_{S2}$, is only about half that of the setup time in the first instance. For example, it may be approximately 15 nanoseconds. This setup time will still be adequate in most cases.

In the third case shown in FIG. 4, the data transfer signal 28 is not received until near the end of the clock cycle. In this case, the setup time $t_{S3}$ is very small, for example, about five nanoseconds. In all likelihood, this will not afford sufficient setup time, unless the above-described design measures are taken to accommodate the small setup time. For example, these measures include the use of fine process geometry and multiple copies of the enable signal. Otherwise, if the setup time $t_{s3}$ is insufficient, the data transfer simply will not take place or errors will occur because of insufficient propagation time for the chip's logic.

In view of the foregoing, it would be desirable to have a method of transferring data from a data source to a bus while insuring that an adequate setup time is available after receipt of a data transfer signal, even where a data transfer signal arrives late in a given clock cycle.

The present invention meets these needs.

SUMMARY OF THE INVENTION

The invention is directed to the transfer of data from a device to a system bus, in particular, the present invention receives an external data transfer signal and creates an internal data transfer signal which is used in its place. This internal data transfer signal is used to control the subsequent data transfer process. The internal data transfer signal begins shortly after the beginning of the clock cycle following the initiation of the external data transfer signal, and terminates shortly after the beginning of the clock cycle following the termination of the data transfer signal.

In response to the internal clock cycle data transfer signal, conventional setup procedures are performed to prepare for the transfer of data from the device to the bus. At the time of the next clock cycle active edge, data is transferred to the first of a pair of data output registers. Since the internal data transfer signal always begins near the beginning of the clock cycle, the system will always have nearly a complete clock cycle for setup before the transfer takes place at the beginning of the next clock cycle.

Each time a new data item is transferred into the first data output register, data in the first data output register is transferred to a second data output register. Both the first and second data output registers will contain data during each clock cycle. Data from the first register is made available to the bus when an internal data transfer signal is present at a predetermined time immediately following a clock cycle active edge. from the second register is made available to the bus when there is no internal data transfer signal present at a predetermined time immediately following a clock cycle active edge.

The invention uses a latched version of the external data transfer signal in the form of an internal data transfer signal during the next clock cycle. Because this internal signal always begins near the beginning of a clock cycle, the logic that depends on that signal will have nearly an entire clock period to accomplish the setup required. The second data output register, used in conjunction with the first data output register, allows data to be output to the bus from either register. There will always be data ready for the bus, even with the delayed internal data transfer signal. The result is an elastic buffer that can handle high-speed bus transactions with modest process geometry and without the use of parallel data transfer signals.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Throughout this description, the preferred embodiment and examples shown should be considered as exemplary, rather than as limitations on the present invention.

Figure 5:
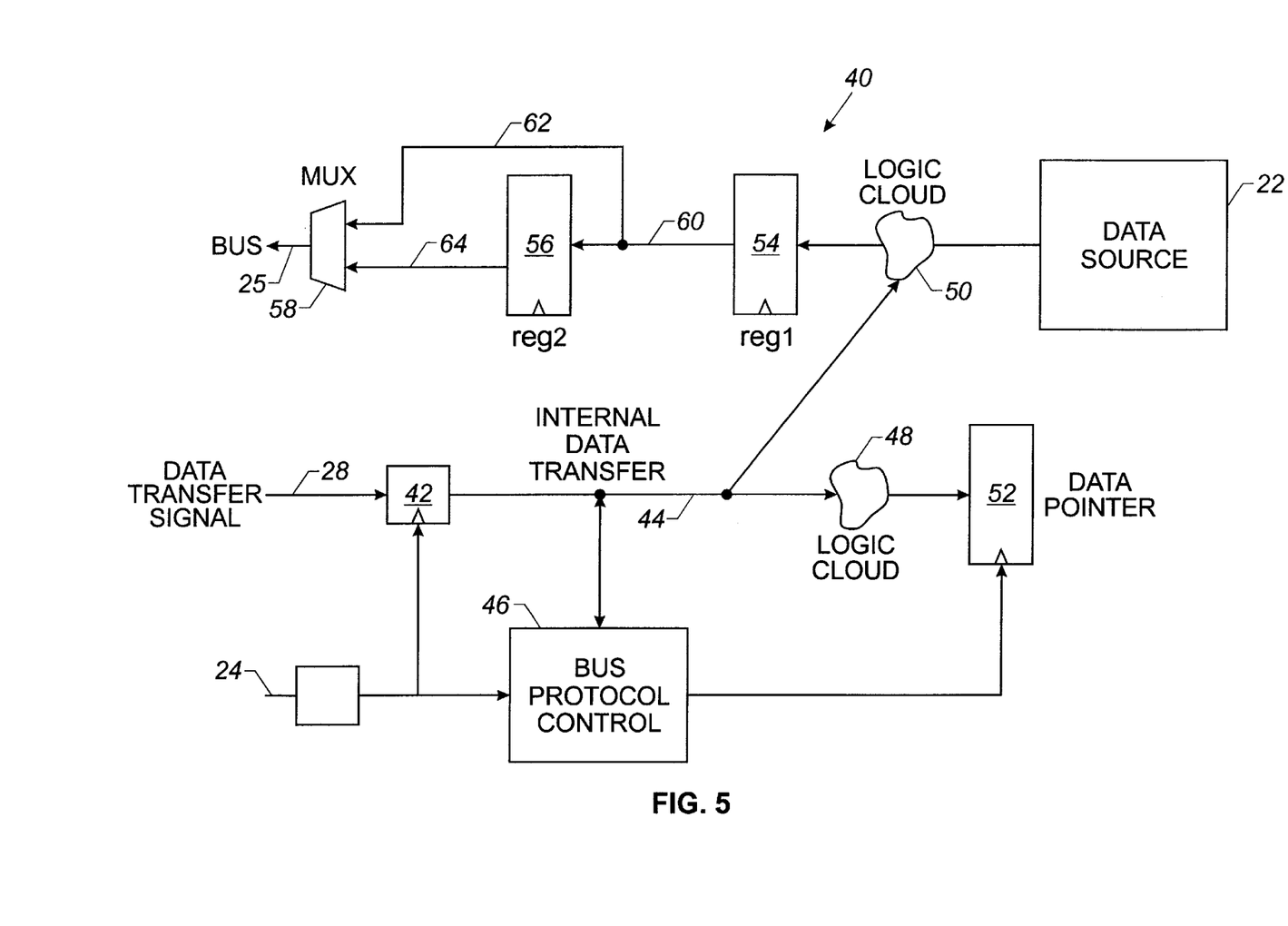
FIG. 5 is a block diagram of a bus interface unit incorporating an elastic buffer according to the invention.

FIG. 5 shows an example of an elastic bus interface 40 in accordance with the invention. The elastic bus interface 40 is connected to a data source, consisting of a device 22, and to a bus 25. An external data transfer signal 28 is received in the same manner as the corresponding signal shown in FIG. 2. A clock 29 generates clock signals. In accordance with the invention, the external data transfer signal 28 is received by an internal data transfer register 42 that stores the external data transfer signal 28. Immediately following the active edge of the clock cycle following the clock cycle in which the external data transfer signal is received, the internal data transfer register 42 generates an internal data transfer signal 44. For example, in a high speed bus with a clock cycle of 33 MHZ, the internal data transfer signal may begin approximately one to two nanoseconds after the active edge of the clock cycle following the external data transfer signal 28. Once the internal data transfer signal 44 is generated, the external data transfer signal 28 is no longer used by the downstream components of the elastic bus interface 40.

The internal data transfer signal is sent to a bus protocol control unit 46, which is a control state machine. The bus protocol control unit 46 controls the operation of the various components of the elastic bus interface 40. Bus protocol control unit 46 may comprise a conventional bus protocol unit similar to bus protocol control unit 30 shown in FIG. 2.

The internal data transfer signal 44, and the bus protocol control signals 46, received by first and second logic circuits 48 and 50. The first logic circuit 48 determines which data source to select among a plurality of data sources. The bus protocol control unit 46 controls this selection. At the same time, a data pointer 52 is incremented to the next appropriate data address. The setup time is the time to accomplish these steps after the receipt of the internal data transfer signal 44. It is notable that, since the internal data transfer signal will always follow immediately after a clock cycle active edge, there will be approximately one complete clock cycle available to accomplish setup before data is actually transferred at the next clock cycle active edge.

Second logic circuit 50 also receives the internal data transfer signal 44 and bus protocol control unit 46 signals to select an appropriate first data output register 54 among a plurality of other data output registers (not shown). First data output register 54 is connected to the second data output register 56 through line 60 and also to the multiplex unit 58 through line 62. Second data output register 56 is connected to the multiplex unit 58 through line 64. The first and second data output registers 54 and 56 form a two stage elastic buffer.

Once the first and second logic clouds 48, 50 have performed their setup tasks in response to an internal data transfer signal 44, the elastic bus interface 40 is ready to transfer the data. This will occur at the time of the active edge of the next clock cycle. When this occurs, a data item pointed to by the data pointer 52 will be transferred to the output of the first data output register 54. A multiplex unit 58 receives outputs from both the first and second data output registers and its output is coupled to the system bus 25.

At the same time that a new data item is transferred from the source 22 into the first data output register 54, a previous data item will be transferred from the first data output register 54 to the second data output register 56. In this way, both the first and second data output registers will provide a two-stage pipeline that constantly contains data.

The decision of whether to transmit data to the bus 25 from the first or second data output registers 54, 56 is made by the multiplex unit 58 as a function of the state of the internal data transfer signal 44. In general, data in the first output register 54 will be available to the bus 25 when the internal data transfer signal 44 is active immediately following a clock cycle active edge. Data in the second data output register 56 will be available to the bus 25 when there is no internal data transfer signal present at a time immediately following the active edge of a clock cycle.

Figure 6:
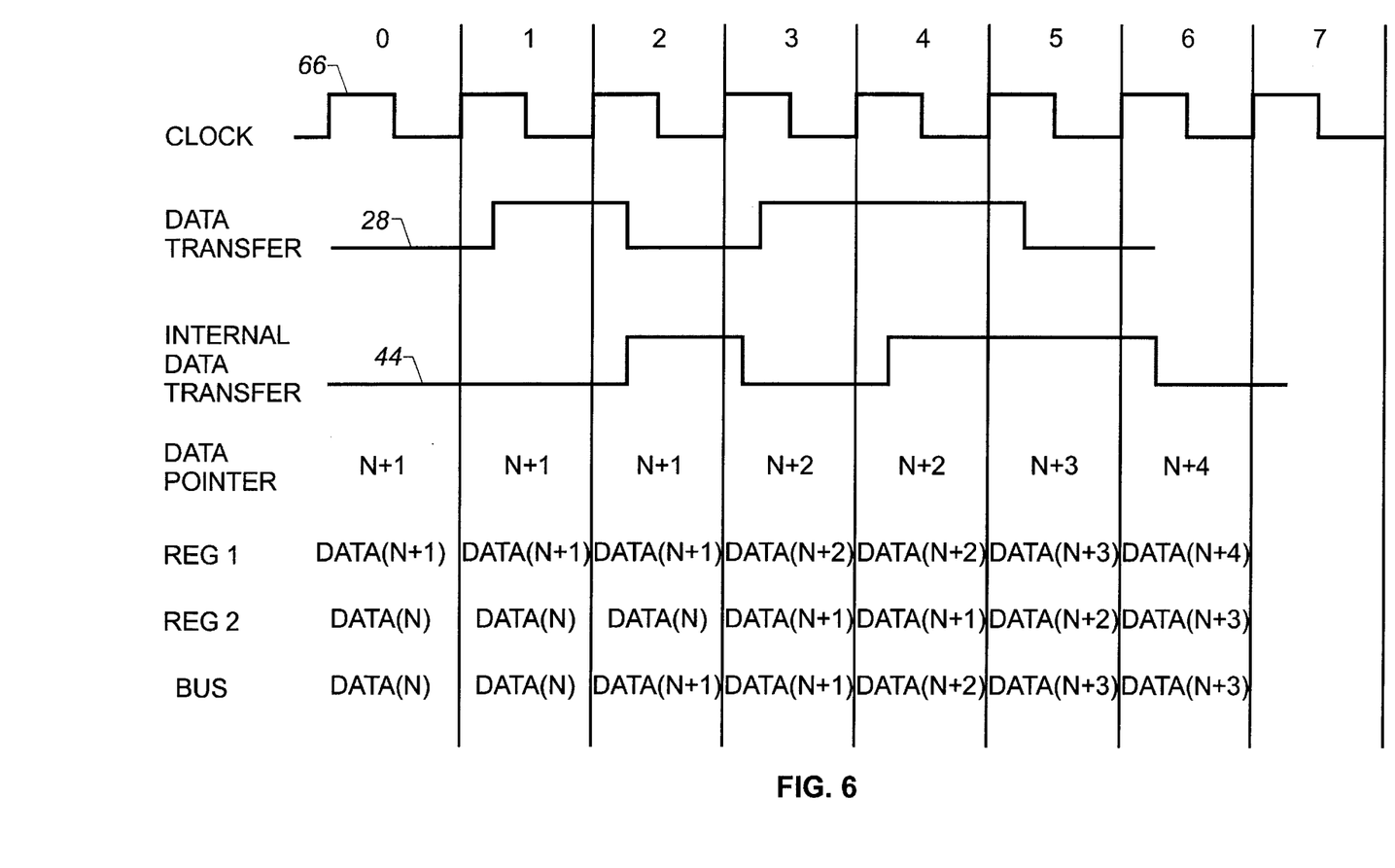
FIG. 6 is a timing diagram of the process of data transfer utilizing the elastic buffer according to the invention.

The operation of the elastic bus interface 40 is illustrated by the timing diagram shown in FIG. 6. This timing diagram includes a clock signal 66, 66 is not shown in FIG. 5, external data transfer signal 28, and an internal data transfer signal 44. These signals are shown during eight clock cycles, numbered zero through seven. FIG. 6 also shows the state of the data pointer and the bus, as well as the flow of consecutive data items N, N+1, N+2, N+3 and N+4.

In clock cycle zero, neither the external data transfer signal 28 nor internal data transfer data signal 44 is present. No change takes place in this state. In this condition, the bus 25 has available to it the data item present the second data output register 56. Also, the data pointer is pointing to the next data item N+1, and the first data output register has received that item (N+1). Since the first and second data output registers are always loaded with data, the first data output register 54 will contain either the current, or a next data item. The second data output register will either contain the current or a previous data item.

In clock cycle one, an external data transfer signal 28 is received. In accordance with the invention this signal is registered in the internal data transfer register 42, and no action is taken until the subsequent clock cycle. From the presence of an external data transfer signal, it can be inferred that data item N has been transferred to its ultimate destination (not shown) along the bus 25. The active edge of clock cycle number two triggers the internal data transfer register 42 to generate an internal data transfer signal 44. In the illustrated example, this signal will begin approximately one to two nanoseconds after the clock cycle leading edge. The timing diagram in FIG. 6 shows the rising edge of the clock as the active edge.

The presence of the internal data transfer signal causes the multiplex unit 58 to make the contents of the first register N+1 available to the bus. Thus, register one contains the output data N+1. Register two contains stale (old) data.

During the bulk of clock cycle two, the elastic bus interface 40 accomplishes the above described setup procedure so that the next desired data item from the appropriate data source will be ready to transfer to the appropriate data output register at the active edge of clock cycle number three. At the beginning of clock cycle number three, the data pointer 52 advances to the next data item (N+2) and loads this data into the first data output register 54. Also, the contents of first data output register 54 (N+1) are transferred to the second data output register 56. In other words, the first and second data output registers "get" the next data item that was "loaded" in the previous clock cycle. Also, the data item N+1 is transferred during the third clock cycle, and the second delta output register 56 now contains the output data (N+1). In the third clock cycle, since the external data transfer signal is not present at the beginning of the active edge of the clock cycle, the internal data transfer signal ends immediately following the third clock cycle active edge.

Also during the third clock cycle, a subsequent external data transfer signal 28 is received. This causes the internal data transfer register 42 to generate an internal data transfer signal immediately following the subsequent clock cycle active edge. During clock cycle number four, since the internal data transfer signal was not present at the active edge of the clock cycle, the data pointer is not incremented. However, after the active edge, the initiation of the internal data transfer signal 44 causes the data in the first data output register to be transferred to the bus. Also during clock cycle four, the second data output register 56 contains stale data.

In clock cycle four, both registers 54 and 56 are "loaded" with the next data item. In this context to "load" means to perform the setup necessary, in response to the internal data transfer signal, in order for the data to be ready for transfer over the bus 25.

In clock cycle five, the two data output registers get the next data items that were loaded in clock cycle four. That is, the first data output register 54 receives the new data item (N+3) and the second data output register 56 receives the next data item (N+2) from the first data output register 54. Likewise, since the internal data transfer signal was asserted at the active edge of clock cycle five, the data pointer advances to the next data item. Also, in clock cycle five, since the second data output register 56 contains stale data, and the internal data transfer signal 44 is present immediately following the active edge of the clock cycle five, the first data output register 54 contains the output data available to the bus. Thus, the N+3 data item is ready for transfer on the bus. Moreover, since the internal data transfer signal is present immediately following the active edge of clock cycle five, both the first and second data output registers are "loaded" with the next data item.

In clock cycle six the internal data transfer signal is not present immediately after the active edge of clock cycle. Therefore, the second data output register 56 will contain the output data (N+3) instead of the first data output register 54. That is, the absence of the internal data transfer signal indicates that no new data item should be ready for transfer. However, this data item is made available from the second data output register to permit the first data output register to be preloaded with the next data item (N+4). This event occurs because the internal data transfer signal 44 was present at the time of the active edge of clock cycle six.

In clock cycle seven, no internal data transfer signal is present at the clock cycle active edge. As a result, the data pointer is not shifted and remains at N+4. Accordingly, first data output register 54 keeps data item N+4 and the second data output register 56 also keeps data item N+3. The second data output register 56 now contains the output data ready for transfer to the bus.

It will be appreciated that the multiplex unit 58 and logic circuits 48 and 50, in conjunction with the first and second data output registers 54, 56, can implement the above steps in response to the clock signal and internal data transfer signals, in particular, the multiplex unit 58 will decide whether the bus will have available the contents of the first data output register 54 or the second data output register 56, based on the state of the internal data transfer signal and the clock signals.

In order to summarize the above described operation of a preferred embodiment of the elastic bus interface 40, the following general rules are employed.

DATA POINTER

When the internal data transfer signal is present at the time of the beginning of the active edge of the clock cycle, the data pointer 52 is advanced to point to the next delta item. It should be noted that the specific data item selected will be determined by other signals received by the bus protocol control unit 46. When the internal data transfer signal is not present at the beginning of a clock cycle, then the data pointer will not change.

INTERNAL DATA TRANSFER SIGNAL

When an external data transfer signal is present at the beginning of the clock cycle, the internal data transfer signal will be asserted (or stay asserted) immediately after the beginning of the clock cycle. This typically will be approximately 1 to 2 nanoseconds after the beginning of the clock cycle. When the external data transfer signal is not present at the beginning of a clock cycle, the internal data transfer signal is de-asserted (or stays de-asserted) immediately after the active edge of the clock cycle.

FIRST DATA OUTPUT REGISTER

When the data pointer 52 points to a new data item (i.e., the internal data transfer signal is asserted at the beginning of a clock cycle), the first data output register 54 gets the new data item indicated by the data pointer. When the data pointer 52 does not change state and points to a new data item (i.e., when the internal data transfer signal is not asserted at the beginning of the clock cycle), the first data output register 54 does not change state.

SECOND DATA OUTPUT REGISTER

When the internal data transfer signal is present at the beginning of the clock cycle, the data item from the first data output register 54 is transferred to the second data output register 56. When the internal data transfer signal is not asserted at the active edge of the clock cycle, there is no change in the data in the second data output register 54.

BUS

When the internal data transfer signal is asserted (or stays asserted) immediately after the beginning of a clock cycle, the data item in the first data output register 54 is made available to the bus. When the internal data transfer signal is not asserted (or stays de-asserted) immediately after the active edge of the clock cycle, the content of the second register 56 is made available to the bus.

Note that by using the second data output register 56 as output to the bus when the internal data transfer signal is not present, the first data output register can be preloaded with the next data item. This permits a continuous flow of data into the bus while always allowing a complete clock cycle for the setup time, regardless of the time in which the external data transfer signal is received within a clock cycle.

Figure 7:
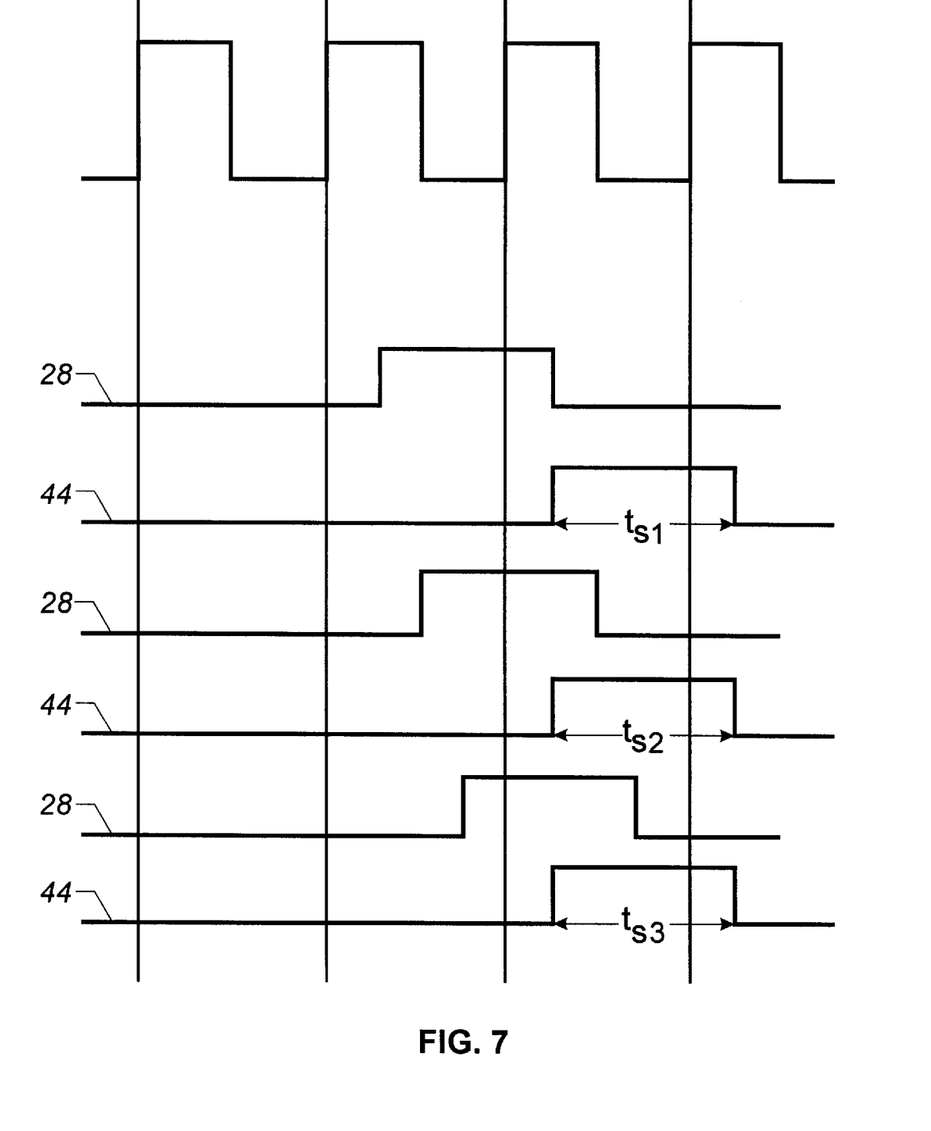
FIG. 7 is a timing diagram of the internal data transfer signal for three different arrival times of the external data transfer signal in accordance with the invention.

FIG. 7 shows graphically how a nearly full clock cycle is maintained for the setup time regardless of when the external data transfer signal is received. In the first case, the external data transfer signal is received immediately after the beginning of a clock cycle. The internal data transfer signal 44 will begin immediately following the subsequent clock cycle active edge. Data transfer will take place at the end of the next clock cycle, thus giving the elastic bus interface 40 a time of $t_{S1}$ to accomplish setup, virtually a complete clock cycle. In this case, the setup time is not much different from what it would be with a conventional bus interface using only the external data transfer signal.

In the second case, the external data transfer signal 28 arrives approximately in the middle of a clock cycle and the internal data transfer signal begins shortly after the beginning of the next clock cycle. The setup time $t_{S2}$ will again be approximately a complete clock cycle. Here, the setup time $t_{S2}$ is about twice what it would be with a conventional bus interface using only the external data transfer signal.

In the third case, the external data transfer signal 28 arrives very late in the clock cycle (e.g., a few nanoseconds before the end of the clock cycle). Accordingly, the internal data transfer signal 44 begins immediately following the next clock cycle and affords a time of $t_{S3}$ for setup, approximately a complete clock cycle. This will be about 30 nanoseconds for a 33 MHZ clock. In this instance, where the external data transfer 44 signal arrives, for example, approximately 3 nanoseconds before the end of the clock cycle, the elastic bus interface 40 allows a setup time which is approximately 10 times that of a conventional bus interface utilizing only the external data transfer signal.

In summary, the invention provides a simple method of transferring data from a data source to a bus that allows adequate setup time for data transfer regardless of the time of receipt of an external data transfer signal. An internal data transfer signal is used in conjunction with a plurality of data output registers configured in a pipeline in a manner which transfers data one clock cycle later than the external data transfer signal. This maintains a consistent and adequate setup time. The invention accomplishes using only modest process geometries that require minimal chip area and power.

A number of embodiments of the present invention have been described. Nevertheless it will be understood that various modifications may be made without departing from the spirit and scope of the invention. For example, other circuit configurations than those shown in the preferred embodiment may be employed to implement the techniques of the invention. Also, the elastic bus interface of the invention may implemented on a single chip integrated circuit or on a plurality of separate circuits. Accordingly, it is to be understood that the invention is not to be limited by the specific illustrated embodiment, but only by the scope of the appended claims.

What is claimed is:

1. A method for transferring data from one device to another along a computer bus comprising:
   (a) generating a clock signal having a plurality of clock cycles;
   (b) receiving an external data transfer signal;
   (c) creating an internal data transfer signal that begins after the beginning of the clock cycle following the external data transfer signal;

(d) transferring the data from the device to a first register in response to the presence of the internal data transfer signal;

(e) transferring existing data from the first register to a second register each time new data is transferred from the device to the first register;

(f) transferring data in the first register to the bus in response to the presence of an internal data transfer signal; and (g) transferring data from the second register to the bus in response to the absence of an internal data transfer signal wherein data is transferred from the device to the first register and from the first to the second register when the internal data transfer signal is present at the time of an active edge of a clock cycle.

2. A method according to claim 1 comprising transferring data in the first register to the bus when the internal data transfer signal is present at a predetermined time after the active edge of a clock cycle.

3. A method according to claim 2 comprising transferring data from the second register to the bus when the internal data transfer signal is absent at a predetermined time after the active edge of a clock cycle.

4. A method according to claim 1, wherein said predetermined time is less than approximately two nanoseconds.

5. A method for transferring data from one device to another along a computer bus comprising:

(a) providing a clock signal;

(b) receiving a signal including an external data transfer signal indicating when to transfer data, wherein the external data transfer signal occurs at varying times with respect to the active edge of the clock signal;

(c) generating an internal data transfer signal that has an active edge beginning immediately after the active edge of the clock cycle that follows the beginning of the external data transfer signal, wherein the internal data transfer signal is delayed from the external data transfer signal by a varying amount;

(d) using the internal data transfer signal to control the transfer of data out of the device;

(e) storing the data transferred out of the device in a first register;

(f) transferring data from the first register to either a second register or to the bus depending on the state of the internal data transfer signal; and (g) transferring data from the second register to the bus when a predetermined state of the internal data transfer signal exists.

6. A method according to claim 5 comprising beginning a setup procedure in preparation for data transfer from the data source at the beginning of the internal data transfer signal, and transferring data at the beginning a subsequent clock cycle, whereby time available for the setup procedure is about one clock cycle.

7. A method for transferring data from one device to another device on a computer bus comprising:

(a) generating a clock signal;

(b) receiving an external data transfer signal from the bus;

(c) storing the external data transfer signal in an input register;

(d) generating an internal data transfer signal that begins immediately after the active edge of the clock cycle following each external data transfer signal, and which terminates immediately after the active edge of the clock cycle that follows the termination of the external data transfer signal, whereby the internal data transfer signal always begins near the beginning of a clock cycle;

(e) outputting the internal data transfer signal from the input register;

(f) transferring existing data from a first register to a second register each time the internal data transfer signal is present at the beginning of a clock cycle;

(g) transferring new data from the first device to a first register each time the internal data transfer signal is present at the beginning of a clock cycle;

(h) transferring data from the first register to the bus each time the internal data transfer signal is present immediately after the beginning of a clock cycle; and (i) transferring data from the second register to the bus when the internal data transfer signal is not present immediately after the beginning of a clock cycle, whereby the first register is preloaded with new data while the second register makes its data available to the bus, and whereby approximately one complete clock cycle is available to accomplish the transfer of data from the device to the first register.

8. A bus interface comprising (a) a data source containing in a plurality of data items;

(b) a bus generating external data transfer signals;

(c) a clock generating a clock signal having an active edge, the clock signal being coupled to the bus;

(d) an input register receiving the external data transfer signals at varying times within some of the clock cycles, the input register generating as output an internal data transfer signal which begins immediately after the active edge of the clock cycle following the clock cycle in which the external data transfer signal is received;

(e) data transfer means for transferring data from the data source in response to the internal data transfer signal and the clock signal;

(f) first output register receiving data from the data transfer means;

(g) second output register receiving data from the first output register; and (h) multiplex unit receiving data from both the first and second output registers and generating as output to the bus, data from either the first or second output registers depending on the state of the input data transfer signal.

9. A bus interface according to claim 8 wherein the internal data transfer signal ends immediately following the active edge of the clock signal following the clock signal in which the external data transfer signal ends.

10. A bus interface according to claim 8 comprising:

(a) bus protocol controller generating a signal coupled to the data transfer means; and (b) the data transfer means comprising first and second logic circuits for selecting among a plurality of data sources and first output registers respectively, depending on the state of the bus protocol signal.

11. A bus interface according to claim 9, the data transfer means further comprising a data pointer, controlled by the internal data transfer signal and the bus protocol controller, for selecting a data item in the data source.

12. A bus interface according to claim 8 wherein the data transfer means begins a setup procedure in preparation for data transfer when the internal data transfer signal begins.

13. A bus interface according to claim 8 wherein the multiplex unit outputs data from the first output register when the internal data transfer signal is present at a predetermined time, and the multiplex unit outputs data from the second output register when the internal data transfer signal is absent at a predetermined time.

14. A bus interface according to claim 13 wherein said predetermined time is immediately after the active edge of any given clock cycle.

15. A bus interface according to claim 14 wherein said predetermined time is less than about two nanoseconds after the active edge of any given clock cycle.

16. A bus interface according to claim 8 wherein the first output register receives data from the device when the internal data transfer signal is present at the beginning of a clock cycle.

* * * * *